United States Patent
Didavide et al.

(10) Patent No.: US 8,449,977 B1
(45) Date of Patent: May 28, 2013

(54) ANTI ABRASION LAYER

(71) Applicant: Center for Abrasives and Refractories Research and Development C.A.R.R.D. GmbH, Villach (AT)

(72) Inventors: Maria Christina Didavide, Zauchen-Villach (AT); Reiner Kunz, Lauffenburg (DE); Jean-Andre Alary, L'Isle sur la Sorgue (FR)

(73) Assignee: Center for Abrasives and Refractories Research and Development C.A.R.R.D. GmbH, Villach (AT)

( * ) Notice: Subject to any disclaimer, the term of this patent is extended or adjusted under 35 U.S.C. 154(b) by 0 days.

(21) Appl. No.: 13/726,421

(22) Filed: Dec. 24, 2012

Related U.S. Application Data

(62) Division of application No. 12/450,936, filed as application No. PCT/EP2008/003085 on Apr. 17, 2008.

(30) Foreign Application Priority Data

Apr. 20, 2007 (DE) .......... 10 2007 019 179

(51) Int. Cl.
*B32B 5/16* (2006.01)
(52) U.S. Cl.
USPC ........... 428/328; 428/323; 428/325; 428/329; 428/330; 428/537.5
(58) Field of Classification Search
USPC ........... 428/323, 325, 328–330, 537.5
See application file for complete search history.

(56) References Cited

U.S. PATENT DOCUMENTS

| | | | |
|---|---|---|---|
| 3,876,579 A | 4/1975 | Hallstrom | |
| 3,954,694 A | 5/1976 | Hallstrom | |
| 4,356,037 A | 10/1982 | Novak | |
| 5,580,652 A | 12/1996 | Lee et al. | |
| 6,218,001 B1 | 4/2001 | Chen et al. | |
| 6,506,818 B1 | 1/2003 | Choi et al. | |
| 7,303,813 B2 * | 12/2007 | Kunz | 428/323 |
| 2002/0086132 A1 | 7/2002 | Suzuki et al. | |
| 2006/0178452 A1 | 8/2006 | Hoefler | |
| 2007/0283654 A1 | 12/2007 | Stanchfield et al. | |

FOREIGN PATENT DOCUMENTS

| | | |
|---|---|---|
| CN | 1849225 A | 10/2006 |
| DE | 2311507 | 10/1973 |
| DE | 2603875 C2 | 8/1976 |
| WO | 2005/023561 A1 | 3/2005 |

OTHER PUBLICATIONS

ROMPP Online, Version 3.6 "Keramik" www.roempp.com/prod/roempp.php (Statement of relevance provided).
Office Action of Parallel German Application (102007019179.2), to the Parent U.S. Appl. No. 12/450,936. Action dated Apr. 14, 2010.

* cited by examiner

*Primary Examiner* — Peter Szekely
(74) *Attorney, Agent, or Firm* — Nath, Goldberg & Meyer; Jerald L. Meyer; Stanley N. Protigal

(57) ABSTRACT

An article has an anti-abrasion layer, comprising a mixture of irregular particles of hard material and round particles essentially free of cutting edges embedded in a matrix material and the use thereof for the production of anti-abrasion surfaces on wood materials, decorative paper, or wood fiber sheets printed with patterns for the production of parquet floors, floor laminates, furniture surfaces or work boards and for the production of wear-resistant surface layers on support materials made from metal, glass, ceramics, plastic concrete or other materials.

13 Claims, 1 Drawing Sheet

ANTI ABRASION LAYER

RELATED APPLICATION(S)

The present patent application is a Divisional Application of U.S. patent application Ser. No. 12/450,936, filed Dec. 2, 2009. U.S. patent application Ser. No. 12/450,936 is a National Phase Application filed under 35 U.S.C. §371 of International Application No. PCT/EP2008/003085, filed on Apr. 17, 2008, which claims foreign priority benefit under 35 U.S.C. §119 of German Application No. 10 2007 019 179.2, filed on Apr. 20, 2007, the entire content of each of which is hereby incorporated herein by reference.

BACKGROUND

1. Field

The present disclosure relates to an article having an anti abrasion layer, comprising a mixture of irregular particles of hard material and round particles of solid material, essentially free of cutting edges, embedded in a matrix material having a substrate and an anti-abrasion layer on the surface of the substrate, in which the substrate is selected from wood materials, decorative papers and wood fibre sheets printed with patterns, and the anti abrasion layer, and the use thereof for the production of wear-resistant surfaces on wood materials, decorative papers, or wood fiber sheets printed with patterns for the production of parquet flooring, laminate flooring, furniture surfaces or work boards, and for the production of wear-resistant surface layers on substrate materials made from metal, glass, ceramic, plastic, concrete or other materials, for the production of tile glazes for coating tiles, and for the production of enamel for metal containers or reactors for the chemicals industry, but also for household appliances and faucets.

2. Background

The process of sealing surfaces of furniture, floors, ceramics, or wear surfaces in general made of a wide variety of materials in order to both protect the surface and give it a decorative appearance is generally known. A very wide variety of matrix materials are used for this purpose, which serve to decrease the sensitivity of the surface to mechanical, thermal or chemical stresses, while simultaneously giving it a decorative look. Frequently, the matrix materials are duroplastic, thermoplastic or elastomeric plastics, which can be hardened under the effects of temperature or radiation.

The surfaces of furniture and floors in particular are frequently exposed to very heavy mechanical stresses, and must be protected accordingly.

Also generally known is the process of providing the surfaces of furniture, flooring, etc. with a decorative appearance by applying so-called high-pressure laminates. In this case, the laminate is frequently comprised of three different layers, a colored or printed decorative paper, a transparent overlay paper on top of this, and a plurality of so-called core papers underneath this, which serve as the substrate for the decorative paper and the overlay paper. Usually, all three papers are impregnated with a hand is thermoset directly onto a wood fiber sheet, and a process is known in which the pattern is printed directly onto a pretreated and primed wood fiber sheet, after which the surface is coated with a clear lacquer which has an acrylate base and is filled with hard aluminum oxide material, and is then radiation hardened.

Substances that are particularly suitable as thermosetting and/or radiation hardenable synthetic resins or lacquer systems include phenolic resins, acrylate resins, epoxy resins, polyester resins, melamine resins, aminoplastics, polyurethanes, and mixtures of these components. In the past, repeated attempts have been made to increase the abrasion resistance of a laminate by embedding particles of hard material in the resin layer with which a core-impregnated decorative paper will be covered, for example.

For instance, several publications and patents describe corresponding methods for producing abrasion-resistant decorative layers or laminates, in which especially particles having an aluminum oxide base are listed as suitable hard material particles for the production of wear-resistant decorative layers. In this case, the preferred range for the average size of these particles lies between 1 and 80 µm.

For instance, U.S. Pat. No. 3,928,706 A describes the production of abrasion-resistant decorative layers which consist of a core paper, a decorative paper, a wear layer and an overlay paper. The wear layer, consisting of a thermosetting synthetic resin with hard materials distributed finely throughout and having a Mohs hardness rating of at least 7, is applied to a surface of either the decorative paper or the overlay paper. All three papers are impregnated with a thermosetting synthetic resin and are processed in the customary manner to a uniformed laminate, in which they are pressed between highly polished pressing plates at temperatures of approx. 150° C.

EP 0 519 242 A1 describes anti abrasion layers of particular clarity and brilliance, which are obtained by providing the decorative paper with a wear layer which contains hard materials sheathed with silane. In this case as well, processing to a finished laminate is achieved via pressing.

In all cases, the production of wear-resistant laminate surfaces by embedding hard materials in overlay or decorative paper or through direct coating with liquid overlays filled with hard materials results in a significant problem in the ultimate production of the laminates, because both with batch operation using presses with highly polished pressing plates, and with continuous operation using pressing belts, the surfaces of the pressing plates or pressing belts are scratched by contact with the particles of hard material, rendering them unusable relatively quickly. This pressing plate wear represents a very significant cost factor in the production of wear-resistant decorative layers.

Attempts to solve the problem of wear during production have in most cases involved employing suitable measures to prevent direct contact between the particles of hard material and the pressing plates.

For instance, WO 2006/013469 describes a method in which a first polymeric layer, which contains particles of hard material, such as corundum, for example, is first applied to a substrate, and then a second polymeric layer, in which particles are embedded which have a relatively high hardness rating but low abrasiveness, is applied to this first abrasion-resistant layer. Particles of this type include glass beads or glass fibers, for example.

A similar method is described by EP 1 319 524 A1, in which the object is attained by using lacquer or impregnating resin systems that contain beads, especially glass beads, which have a relatively high hardness rating but low inherent abrasiveness. In this case, the use of actual hard materials is dispensed with entirely.

In WO 02/066265 A1, a method of producing a decorative paper is described in which abrasion-resistant particles, such as corundum or silicon carbide, for example, which are embedded in the resin, are coated in an additional process step with glass beads or glass fibers, in order thereby to prevent the corundum or silicon carbide particles from coming into direct contact with the reflective surface of the press and damaging it. The beads or fibers are thus intended to ensure the desired protective spacing between the abrasion-resistant particles and the pressing plate or pressing belt.

EP 1 339 545 B1 describes an anti abrasion layer with an synthetic resin base, wherein, in addition to the particles of hard material having a Mohs hardness rating of at least 6, round, solid material particles in the form of beads that are essentially free of cutting edges are embedded in the synthetic resin system, said beads having a low hardness rating and an average particle diameter that is greater than the average particle diameter of the particles of hard material. In this manner, direct contact between the pressing plate surface and the particles of hard material is largely prevented, and the round solid material particles serve quasi as spacers.

All of these methods have the disadvantage, however, that in the outer area of the decorative layer, rather than particles of hard material, particles of lower hardness are contained, thereby decreasing the wear-resistance of the layer overall.

Precisely in the area of flooring or laminate flooring, especially in public buildings or industrial facilities, but also on surfaces of furniture or working boards that are subject to frequent use, wear-resistance plays an increasingly greater role, and is used as a very convincing sales argument and criterion for quality. For example, laminate sheets are subjected to abrasion classification, wherein in a so-called "Taber test" the resistance to abrasion is determined, and the flooring is divided into abrasion classes. This test is used to determine the resistance of the cover layer to wear. Abrasion is achieved by rotating a test sample under stressed, cylindrical friction wheels covered with defined lubrication gel paper. The number of rotations necessary to produce a predetermined degree of abrasion is measured.

For this test, according to DIN EN 13329, test samples measuring approximately 100 mm×100 mm are taken from a laminate floor element and are divided into four quadrants using a marking pen. The surface of the test sample is processed under precisely defined conditions (pressure, rotation, etc.) with two friction wheels covered with a defined lubrication gel paper, wherein the strips of lubrication gel paper are replaced after every 200 rotations. This test is continued until a so-called initial abrasion point (IP) is reached. The initial abrasion point (IP) is the point at which abrasion through the decorative printing is clearly discernible for the first time, and the lower layer is exposed in three of the four quadrants. In this manner, laminate floors are divided into abrasion classes from AC 1 to AC 5, which corresponds to an IP value of ≧900 to ≧6000.

DETAILED DESCRIPTION

Overview

Figure 1:
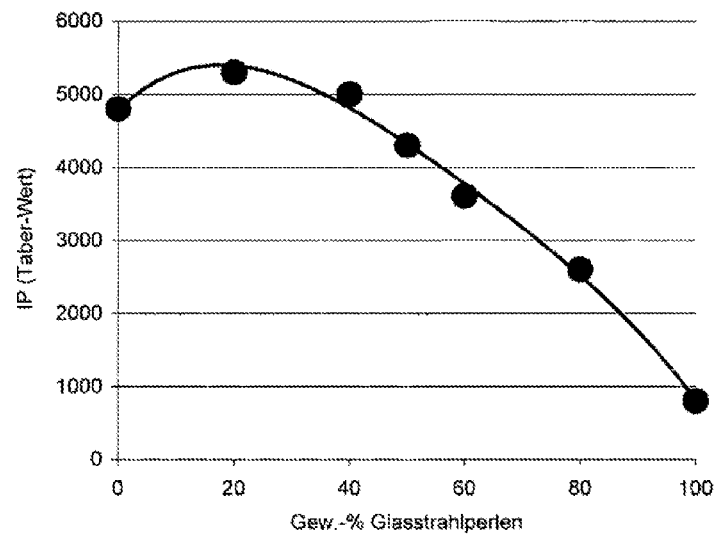
FIG. 1 is a graphic representation depicting the results of a Tabor test performed on a test sample.

The object of the disclosed subject matter is thus to increase the abrasion resistance of anti abrasion layers without also increasing the wear on pressing plates or pressing belts. The object is attained with an anti abrasion layer in which an anti-abrasion layer includes a mixture of irregular particles of hard material and round solid material particles, essentially free of cutting edges, embedded in a matrix material. The abrasion layer includes the particles of hard material have a Mohs hardness rating of at least 6, and the solid material particles have a Mohs hardness rating of at least 3. The material is such that:
 i. the average particle diameter of the solid material particles is equal to or less than the average particle diameter of the particles of hard material;
 ii. the round solid particles essentially free of cutting edges are made of a material selected from the group consisting of glass and sintered ceramic; and
 iii. the ratio of round solid material particles, essentially free of cutting edges, in the embedded mixture is 10 to 50 wt.-%, based on the total amount of embedded particles.

Surprisingly, it has been found that an anti abrasion layer with increased wear resistance is achieved by embedding a mixture of irregular hard material particles having a Mohs hardness rating of at least 6 and round solid material particles, essentially free of cutting edges, having a Mohs hardness rating of at least 3 in a matrix material. In this, the average particle diameter of the solid material particles must be equal to or smaller than the average particle diameter of the particles of hard material.

The surprising result of multiple wear-resistance tests was that the wear resistance of an anti abrasion layer is increased when some of the particles of hard material, which are believed to effect the resistance to wear, are replaced by round solid material particles, which are essentially free of cutting edges and which have an average particle diameter that is equal to or smaller than the average particle diameter of the particles of hard material. This interesting phenomenon was detected in a series of different matrix materials. Equivalent effects were found with lacquers, plastics, glass, ceramic and enamel.

In particular, when duroplastic, thermoplastic or elastomeric plastics were used as the matrix material, a corresponding replacement of irregular particles of hard material with round solid material particles which are free of cutting edges resulted in a significant increase in resistance to abrasion of the anti abrasion layer, which may be attributable to the particularly good bonding of the essentially round solid material particles in this system. One preferred embodiment provides that the matrix material is a synthetic resin based upon melamine, acrylate, epoxy, polyurethane, polyamide, polyester, polyimide, latex, rubber, or mixtures of these. These systems are preferably used for anti abrasion layers, and an increase in the abrasion resistance of the corresponding layers is of particular technical relevance.

The ratio of round solid material particles that are essentially free of cutting edges in the embedded mixture can vary between 0.1 and 99.0 wt.-%, referred to the total number of embedded particles. This wide application range makes sense because in many areas a fine line exists between high pressing plate wear and particularly high resistance to wear. Here, it must be newly determined for each case what ratios of round solid material particles without cutting edges the embedded mixture will tolerate without a breakdown in wear resistance being observed. Although high ratios of round solid material particles lead to reduced pressing plate wear, they also lead to a decreased resistance to wear overall. Preferably, 5 to 70 wt.-% round particles of solid material, referred to the overall mixture, are used. Especially in the area of laminate flooring, it has been found that particularly advantageous results can be achieved when 10 to 50 wt.-% of the overall mixture is round solid material particles. With the latter ratios, increases in wear resistance as compared with the use of purely hard materials are identified consistently in all systems.

The irregularly shaped particles of hard material are usually selected from the group of aluminum oxide, corundum, molten corundum, sintered corundum, zirconium corundum, sol-gel corundum, silicon carbide and boron carbide. Because the Mohs hardness rating of all these substances is well above 6, the hardness of the hard materials themselves generally plays a subordinate role in the selection of a hard material for specific applications. Frequently, these materials are chosen based upon their transparency, color, pressure resistance and binding behavior in the matrix. Thus one of the most popular hard materials for use in anti abrasion layers is molten corundum, which, in addition to its high hardness rating, is characterized by the fact that it is available in large quantities, inexpensive to produce, and available in different colors. For instance, noble corundum white is frequently used for transparent laminates, because the transparency and color neutrality of the anti abrasion layer is obtained even with relatively high ratios of corundum. Round solid material particles that are free of cutting edges are generally spherical beads made of glass or sintered ceramic. Depending upon the beads that are used, additional variations in the relationship between wear resistance and pressing plate wear can be realized.

Glass beads have proven particularly suitable, because they have a relatively high hardness rating but are also transparent and can be obtained in large quantities at a reasonable cost. Added to this is the fact that glass beads can be obtained in nearly any desired diameter. In addition to pure glass beads, however, compounds that have lower or higher hardness ratings than pure glass can also be used.

For certain applications, the use of sintered ceramic particles that are free of cutting edges can also be advantageous, although the lack of transparency severely limits their use. For example, these ceramic particles can be used in non-transparent, colored cover layers when the intention is to further increase the hardness of the round solid material particles in order to further decrease the ratio of irregular, unevenly shaped particles of hard material while retaining wear resistance.

In general, the round solid material particles without cutting edges consist essentially of silicon oxide, aluminum oxide, mullite, spinel or zirconium oxide, or mixtures of these. The color, hardness and pressure and/or breaking behavior of the round solid material particles without cutting edges can be varied using additional modifying constituents, such as sodium oxide, lithium oxide, potassium oxide, iron oxide, titanium oxide, magnesium oxide, calcium oxide, neodymium oxide, lanthanum oxide, cerium oxide, yttrium oxide and/or boron oxide, for example.

The total quantity of embedded particles of solid material is usually 2 to 80 vol.-%, referred to the matrix material. This corresponds to a ratio of embedded, solid material particles in the matrix, based upon the relative density difference between matrix material and solid material particles of 2 to 200 g per m2. For preferred embodiments, especially in the area of laminates, the total quantity of embedded solid material particles is 10 to 50 g per m2.

It has been found with respect to both the transparency of the anti abrasion layer and the binding of the hard materials or the round solid material particles, free of cutting edges, that surface treating the particles with an adhesive agent results in improvements with respect to transparency and binding. Suitable substances for surface treatment are silanes, especially organosilanes, for example aminoalkylsilane or aminoalkylalkoxysilanes. Treatments of this type are known and are frequently used to improve the binding of solid materials, especially oxidic solid materials, in organic matrix materials. Especially when corundum is used as the hard material and glass beads are used as the round solid material free of cutting edges, a pretreatment of the particles or mixtures thereof with aminopropyltriethoxysilane has a most positive effect on the binding and on the transparency of the anti abrasion layer.

With a particular embodiment of the present disclosure, aminoalkylalkoxysilanes from the group of aminopropyltrimethoxysilane, 3-aminopropyltriethoxysilane, 3-aminopropylmethyldimethoxysilane, 3-aminopropylmethyldiethoxysilane and/or N-(2-aminoethyl)-3-aminopropyltrimethoxysilane are used for the surface treatment. The quantity of silane is customarily 0.1 to 10 wt.-%, referred to the ratio of hard material particles and/or solid material particles. The treatment itself has long been known and is relatively uncomplicated. For example, silanes can be added as a 20% solution in distilled water directly to the hard material particles or solid material particles, or to the mixtures thereof, in a mixer, then mixed, and finally dried at approx. 80° C.

The anti abrasion layer can be used to produce wear-resistant surfaces on wood materials, on impregnated decorative paper, or on wood fiber sheets printed with patterns for producing parquet floors, floor laminates, furniture surfaces, or work boards. Moreover, the anti abrasion layer can be used to produce wear-resistant metal surfaces, for example in combination with wet or powdered lacquer systems, with or without solvents. Another interesting use for the anti abrasion layer relates to the production of glazes for coating tiles and sanitary ceramics or for the production of enamel for coating metal containers, reactors for the chemicals industry, household appliances such as stoves, pots and pans, and faucets.

In what follows, the disclosed subject matter will be described in greater detail in reference to examples, and the selected applications in the area of laminates will be described, as in this area the evaluation of resistance to wear is standardized, allowing the individual tests to be compared. This is not intended as a restriction, however, rather it has been found within the scope of the tests that comparable conditions are also present in the other systems mentioned above.

EXAMPLES

Experiment Series 1

Different Concentrations of Round Solid Material Particles, Free of Cutting Edges As the starting material for the round solid material particles that are essentially free of cutting edges, glass beads (Sovitec, FR) were used, which were classified as screening "grit 220," analogous to the customary screens for abrasive particles according to the FEPA standard 42-D-1984 R 1993. The hardness of the glass beads was 5.1 GPa according to Vickers (HV0.2) (Mohs 5), and was determined for beads having a diameter of 0.4-0.6 mm.

As the starting material for the irregular particles of hard material, noble corundum white (Alodur ZWSK-220, Treibacher Schleifmittel AG, AT) was used. Vickers hardness (HV0.2)=20.2 GPa (Mohs 9).

In the following Table 1, the respective screen analyses according to FEPA are listed, wherein the results are given in wt.-% of the screen residue per test screen or as a bottom fraction.

TABLE 1

| | Screen size (μm) | | | | |
|---|---|---|---|---|---|
| | 106 | 75 | 53 | 45 | Bottom |
| | Screen residues/bottom fraction (%) | | | | |
| Alodur ZWSK-220 | 0 | 8.3 | 72.7 | 11.9 | 7.1 |
| Glass beads grit 220 | 0 | 3.2 | 76.3 | 15.1 | 5.4 |

In Table 2, the results of measurement of the particle size distribution of the same sample via laser diffraction [Malvern Instruments Ltd., UK instrument type: master sizer 2000 with Hydro 2000S(A) dispersion module] are listed. In this case, the results are typically given as vol.-% (d10, d50, d90).

TABLE 2

| | Particle size distribution (vol.-%) | | |
|---|---|---|---|
| | $d_{90\%}$ | $d_{50\%}$ | $d_{10\%}$ |
| | Particle diameter (μm) | | |
| Alodur ZWSK-220 | 112.0 | 74.08 | 48.68 |
| Glass beads grit 220 | 77.41 | 55.50 | 39.64 |

Note:
$d_{50\%}$ means that 50% of the particles measured with laser diffraction lie below the indicated μm value As Tables 1 and 2 show, despite approximately equal screening according to FEPA, measurement using the laser diffraction method (Malvern) results in a significantly smaller average particle size d50 for the glass beads. From these representations, it is apparent that
the description of relative particle size distributions is very highly dependent upon the respective method of measurement that is used. When, in what follows, the average particle size is mentioned, measurement via laser diffraction is always used as the basis for the numerical values—unless explicitly otherwise specified.

The irregular particles of hard material and the round solid material particles that are essentially free of cutting edges were each subjected to surface treatment separately, wherein 500 g of the particles each were added to distilled water, along with 12 g of a 20% solution of aminopropyltriethoxysilane (AMEO, Degussa, DE), and were then mixed in a pan-type mixer. The mixture treated in this manner was dried in a drying oven at 80° C. for several hours.

From the respectively coated, irregular particles of hard material and the round solid material particles that are essentially free of cutting edges, different mixtures (see Table 1) were then used to produce laminate test samples for the so-called Taber test according to DIN EN 13329.

For this purpose, a decorative paper was core impregnated with melamine formaldehyde resin (Prefère 70 0562L, Dynea, AT), additives, and hardeners (Melatec, CH), according to the prior art. The anti abrasion layer in the form of a suspension of melamine formaldehyde resin with particles of hard material, round solid material particles, or mixtures thereof was applied to this impregnated and damp decorative paper using the "wet-in-wet method," and was then dried in a drying oven at 145° C. to a residual moisture level of 5-6%.

The concentration of solid material particles in the melamine formaldehyde resin suspension was selected such that the ratio of solid material particles in the finished test sample was 25 g/m2, which corresponded to a content of 30-40 vol.-% solids ratio, referred to the matrix material.

The decorative paper was then placed on an HDF panel and covered with an overlay paper which had also been impregnated with melamine formaldehyde resin. An opposite paper was placed underneath the HDF panel. This overall construction of opposite paper/HDF panel/decorative paper/overlay paper was then pressed for 15 seconds at 205° and a pressure of 350 N.

The test sample obtained in this manner was subjected to a Taber test. The test results are listed in Table 3 and illustrated in the corresponding graphic (FIG. 1).

TABLE 3

| Example | Alodur-ZWSK F220 $d_{50\%}$ = 74.08 μm* (wt.-%) | Glass beads, grit 220, $d_{50\%}$ = 55.50 μm* (wt.-%) | Taber test IP value (rotations) |
|---|---|---|---|
| 1 | 100 | — | 4800 |
| 2 | 80 | 20 | 5300 |
| 3 | 60 | 40 | 5000 |
| 4 | 50 | 50 | 4300 |
| 5 | 40 | 60 | 3600 |
| 6 | 20 | 80 | 2600 |
| 7 | — | 100 | 800 |

Note:
*= laser diffraction (Malvern)

As the results of Table 1 and the corresponding graphic representation of FIG. 1 show, the wear resistance of the laminate test sample is surprisingly increased by replacing particles of hard material with softer glass beads. Particles of hard material can be replaced by softer glass beads up to a ratio of nearly 40 wt.-% without significantly decreasing wear resistance. This results not only in a significant reduction in wear on the pressing plate, in some cases even making it possible to dispense with overlay paper, but also in an overall reduction in cost, because the glass beads are generally less expensive than the corresponding hard material particles.

Experiment Series 2

Different Size Ratios D50% Hard Materials:D50% Solid Material Particles

In this series of experiments, the same starting materials were used as in experiment series 1, however different screenings for the glass beads were performed. In this case as well, the screenings were performed based upon the FEPA standard.

In Table 4, the particle size distributions of the sample according to FEPA are presented.

TABLE 4

| | Screen size (μm) | | | | | | |
|---|---|---|---|---|---|---|---|
| | 150 | 106 | 75 | 63 | 53 | 45 | Bottom |
| | Screen residues/bottom fraction (%) | | | | | | |
| Alodur ZWSK-220 | | 0 | 8.3 | — | 72.7 | 11.9 | 7.1 |
| Glass beads Grit 180 | 0 | 39.4 | 57.2 | — | 2.7 | 0.6 | 0 |
| Glass beads Grit 220 | | 0 | 3.2 | — | 76.3 | 15.1 | 5.4 |
| Glass beads Fine grit | | | 0 | 0.1 | 9.9 | 23.5 | 66.5 |

In addition, the results of laser diffraction analysis (Malvern) are listed in Table 5.

TABLE 5

| | Particle size distribution (vol.-%) | | |
|---|---|---|---|
| | $d_{90\%}$ | $d_{50\%}$ | $d_{10\%}$ |
| | Particle diameter (μm) | | |
| Alodur ZWSK-220 | 112.0 | 74.08 | 48.68 |
| Glass beads grit 180 | 124.76 | 90.07 | 64.90 |
| Glass beads grit 220 | 77.41 | 55.50 | 39.64 |
| Glass beads fine grit | 56.30 | 34.77 | 20.87 |

Tables 4 and 5 also show that the description of relative particle size distributions is highly dependent upon the respective measurement method that is used. In what follows, when the average particle size d50% is mentioned, measurement by laser diffraction (Malvern) is always used as the basis for the numerical values—unless explicitly specified otherwise.

In experiment series 2, only 50:50 mixtures were used. The corresponding mixtures are summarized in Table 6, indicating the respective average particle size d50%. For purposes of comparison, pure hard material suspensions having 50% or 100% hard material ratios have been listed.

Figure 2:
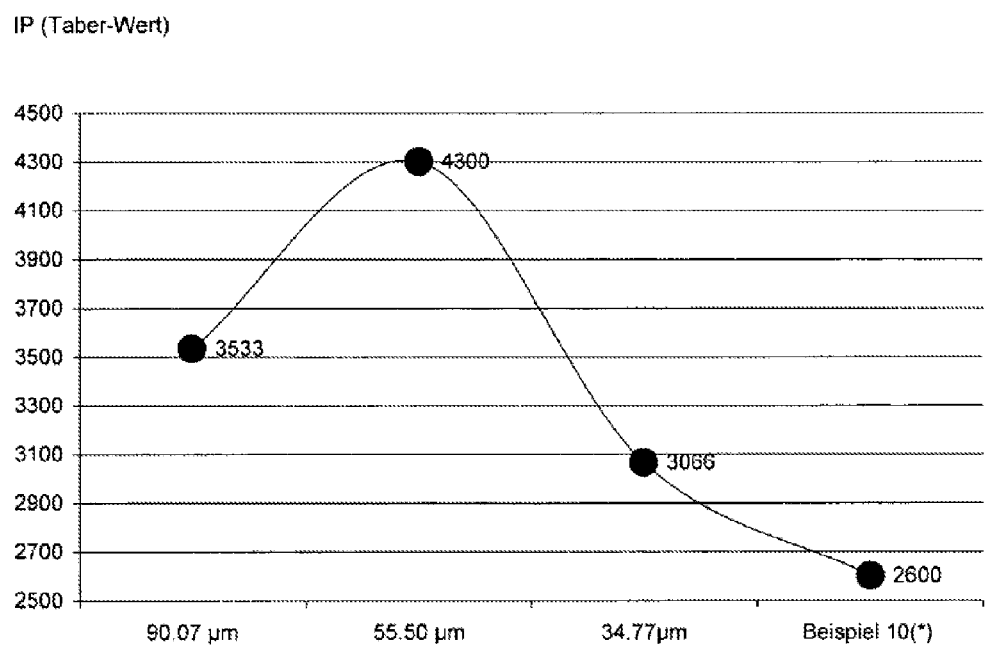
FIG. 2 is a graphic representation depicting the results of a Tabor test showing the results of a shift in the ratio of average particle size of round solid material to the average particle size d50% of the particles of hard material.

The production of the test sample for the Taber test was performed analogous to experiment series 1. The results of the Taber test are compiled in Table 6 and graphically illustrated in FIG. 2.

TABLE 6

| | Alodur ZWSK F220 | Glass beads (wt.-%) | | | Taber test |
|---|---|---|---|---|---|
| Example | (wt.-%) $d_{50\%}=$ 74.08 μm | Grit 180 $d_{50\%}=$ 90.07 μm | Grit 220 $d_{50\%}=$ 55.50 μm | Fine Grit $d_{50\%}=$ 34.77 μm | IP value (rotations) |
| 8 | 50 | 50 | — | — | 3530 |
| 4 | 50 | — | 50 | — | 4300 |
| 9 | 50 | — | — | 50 | 3060 |
| 10 | 50 | — | — | — | 2600 |
| 1 | 100 | — | — | — | 4800 |

The results of Table 2 and the graphic representation (FIG. 2) show that even a relatively small shift in the ratio of the average particle size d50% of the round solid material particles to the average particle size d50% of the particles of hard material in the coarser area, referred to the solids particles, results in a surprisingly significant decrease in wear resistance. Apparently, the optimum with respect to wear resistance for the average particle size d50% of the round solid material particles lies slightly below the average particle size d50% of the hard material particles. In contrast, if the average particle size of the round solid material particles is significantly smaller (see Example 9), a significant decrease in wear resistance is also observed.

Moreover, it has been found that, in general, adding glass beads to an anti abrasion layer that is equipped only with particles of hard material (Example 10 as compared with Examples 8, 4 and 9) results in a significant increase in wear resistance.

What is claimed is:

1. An article having a substrate and an anti-abrasion layer on the surface of the substrate, wherein the substrate is selected from wood materials, decorative papers and wood fibre sheets printed with patterns, and the anti abrasion layer comprises:
   a mixture of irregular particles of hard material and round solid material particles, essentially free of cutting edges, embedded in a matrix material, wherein:
   the particles of hard material have a Mohs hardness rating of at least 6, and the solid material particles have a Mohs hardness rating of at least 3, characterized in that:
   i. the average particle diameter of the solid material particles is equal to or less than the average particle diameter of the particles of hard material;
   ii. the round solid particles essentially free of cutting edges are made of a material selected from the group consisting of glass and sintered ceramic; and
   iii. the ratio of round solid material particles, essentially free of cutting edges, in the embedded mixture is 10 to 50 wt.-%, based on the total amount of embedded particles.

2. The article of claim 1, wherein the matrix material is selected from the group consisting of lacquer, plastics, glass, ceramic and enamel.

3. The article of claim 1, wherein the matrix material is a duroplastic, thermoplastic or elastomeric plastic.

4. The article of claim 1, wherein the matrix material is a synthetic resin with a base of melamine, acrylate, epoxy, polyurethane, polyamide, polyester, polyimide, latex, rubber, or mixtures thereof.

5. The article of claim 1, wherein the irregular particles of hard material are selected from the group consisting of aluminum oxide, corundum, molten corundum, sintered corundum, zirconium corundum, sol-gel corundum, silicon carbide and boron carbide.

6. The article of claim 1, further comprising up to 15 wt.-% modifying constituents, selected from the group consisting of $Na_2O$, $Li_2O$, $K_2O$, $Fe_2O_3$, $TiO_2$, MgO, CaO, NbO, LaO, $Y_2O_3$, CeO and $B_2O_3$.

7. The article of claim 1, wherein the total quantity of solid material particles embedded in the matrix is 5-70 vol.-%, based on the matrix material.

8. The article of claim 1, wherein the total quantity of solid material particles embedded in the matrix is 2 to 200 g/m².

9. The article of claim 1, wherein the irregular particles of hard material and/or the round solid material particles, essentially free of cutting edges, are subjected to surface treatment with organic and/or inorganic adhesive agents before being embedded in the matrix material.

10. The article of claim 9, wherein the adhesive agent comprises an organosilane, selected from the group consisting of an aminoalkylsilane or an aminoalkylalkoxysilane selected from the group consisting of aminopropyltrimethoxysilane, 3-aminopropyltriethoxysilane, 3-aminopropylmethyldimethoxysilane, 3-aminopropylmethyldimethoxysilane, 3-aminopropylmethyldiethoxysilane, and N-(2-aminoethyl)-3-aminopropyltrimethoxysilane.

11. The article of claim 9, wherein the ratio of silane is 0.1 to 10 wt.-%, referred to the total ratio of particles of hard material and/or solid material particles.

12. The article of claim 9, characterized in that the adhesive agent comprises a silane.

13. The article of claim 9, wherein the adhesive agent comprises an organosilane.

* * * * *